United States Patent [19]

Klingler

[11] Patent Number: 5,323,272
[45] Date of Patent: Jun. 21, 1994

[54] TIME DELAY CONTROL FOR SERIAL DIGITAL VIDEO INTERFACE AUDIO RECEIVER BUFFER

[75] Inventor: Keith L. Klingler, Indianapolis, Ind.

[73] Assignee: Ampex Systems Corporation, Redwood City, Calif.

[21] Appl. No.: 907,426

[22] Filed: Jul. 1, 1992

[51] Int. Cl.$^5$ .......................... G11B 5/00; G11B 5/02
[52] U.S. Cl. ..................................... 360/8; 360/19.1; 360/33.1; 360/36.2; 365/221; 358/343
[58] Field of Search ................. 365/221; 358/341, 343; 360/19.1, 20, 21, 33.1, 36.2, 8

[56] References Cited

U.S. PATENT DOCUMENTS

| | | | |
|---|---|---|---|
| 4,473,850 | 9/1984 | Foerster et al. | 360/19.1 |
| 4,763,206 | 8/1988 | Takahashi et al. | 360/8 |
| 4,833,651 | 5/1989 | Seltzer et al. | 365/221 |
| 4,888,739 | 12/1989 | Frederick et al. | 365/221 |
| 4,961,116 | 10/1990 | Kanamaru et al. | 358/343 |
| 5,016,221 | 5/1991 | Hamstra | 365/221 |

FOREIGN PATENT DOCUMENTS

| | | |
|---|---|---|
| 0178075 | 4/1986 | European Pat. Off. . |
| 0312239 | 4/1989 | European Pat. Off. . |
| 0395210 | 10/1990 | European Pat. Off. . |

OTHER PUBLICATIONS

Patent Abstracts of Japan vol. 15, No. (E-1031) Feb. 8, 1991 & JP-A-22 83 149 (Hitachi Cable).
Patent Abstracts of Japan vol. 6, No. 145 (P-132) Aug. 4, 1982 & JP-A-57 066 515 (Victor Co of Japan).
International Radio Consultative Committee Recommendation 656 International Radio Consultative Committee Recommendation 601-2.
Proposed Society of Motion Picture and Television Engineers Standard 125M Audio Engineering Society Recommended Practice AES3-1985(ANSI S4.40-1985).

*Primary Examiner*—Edward P. Westin
*Assistant Examiner*—Jon Santamauro
*Attorney, Agent, or Firm*—Richard C. Liu; John G. Mesaros; Ralph L. Mossino

[57] ABSTRACT

An audio receiver FIFO memory buffer in the serial digital video interface allows improved timing synchronization between video and audio information. Furthermore, it eliminates unpleasant sound effects when multiple data samples are skipped or repeated in series. This FIFO receiver buffer receives data at an input write-data rate filling up the memory storage cells therein. An output read-data signal clocks the data out of the memory storage cells. The FIFO's fullness is monitored and maintained, in response to an external signal, to within a specified range delimited by an upper and a lower threshold. If the FIFO buffer fullness is below the range's lower threshold, then the FIFO's read address pointer is held so that the immediately preceding read out data element is read out again, but only once. On the other hand, the FIFO buffer fullness is over the range's upper limit, then the FIFO's write address pointer is held so that the immediately preceding written in data element is written over, but only once.

24 Claims, 1 Drawing Sheet

TIME DELAY CONTROL FOR SERIAL DIGITAL VIDEO INTERFACE AUDIO RECEIVER BUFFER

BACKGROUND OF THE INVENTION

1. Field of the Invention

The present invention generally relates to digital audio information processing, and particularly, to serial digital video interface audio sample processing, and more particularly, to improvement of an audio channel first-in first-out (FIFO) memory buffer enhancing audio signal quality and maintaining synchronization with video information.

2. Description of the Related Art

A digital audio or video recording is no more than a series of numbers, and hence can be copied through an indefinite number of generations without degradation. This implies that the life of a recording can be truly indefinite, because even if the medium begins to decay physically the sample values can be copied to a new medium with no loss of information. For the highest-quality post-production work, digital interconnection between such items as switchers, recorders and effects machines is highly desirable to avoid the degradation due to repeated conversion and filtering stages.

Digitized audio and video information, although sampled at different rates, can be multiplexed to provide cabling savings. A distinct advantage of such multiplexed transmission is where numerous pieces of video/audio equipment need to be interconnected in various ways for different purposes such as in a professional studio environment, a matrix distribution unit is more easily realized than that of having separate video and audio connections. A number of standards has been or is being developed to establish guidelines for serial digital video interface in between studio equipment which accomodates the video and audio information multiplex for data transmission, such standards are the International Radio Consultative Committee (CCIR) Recommendations 656&601-2, and the proposed Society of Motion Picture and Television Engineers (SMPTE) Standard 125M. In general, in transmitting digital video images with a 27 MHz transmission frequency, a line of video information is separated from another by a horizontal sync interval which provides a sufficient amount of time allowing the electron beam steering mechanism to adjust from the end of one raster line to the beginning of the next raster line. Ancillary information such as digitized audio samples each having binary values and a specified word length may be multiplexed into these sync intervals. Therefore, audio information associated with a video frame image may be embeded between lines of that video frame.

Despite the ease of transmission routing in between pieces of equipment, i.e., carrying video and audio information on one cable instead of two, however, within each equipment the combined video and audio signal often requires demultiplexing in order to meet separate processing demands. Since the audio information inserted into the sync intervals is typically digitized at a sampling frequency different from 27 MHz (the transmission frequency), for instance at 48 KHz, a FIFO memory buffer acting as an audio data receiver is usually necessary to receive the extracted audio data at the transmission frequency, 27 MHz, and to output audio data at the original sampling frequency, namely, 48 KHz, ensuring synchronization with its respective video data thereby.

Typically, there is a fixed number of audio samples per video frame, for instance, in accordance to the aforementioned standards, there are 8008 audio samples for every 5 video frames in a 525 line/59.94 Hz system. In this case, the number of audio samples in the FIFO buffer is maintained at a particular value for every 5 video fields, meaning that each audio sample stays in the FIFO buffer for approximately the same amount of time. If any additional time delay or time advance relative to the video information is introduced at the audio FIFO memory buffer stage, video and audio information would be out of sync. There are various reasons for such an additional delay or advance, one of which is that the FIFO memory buffer output frequency drifts against its input frequency, for example, processing images made by equipment not having the video and audio frequencies phase locked. Another of which is the extensive signal switching activities. Because the total number of audio samples of any one video field may not be exactly the same as its immediate successor field, switching activities such as generating image composites from various sources may cause a gradual increase or decrease of audio samples in the FIFO buffer. If uncorrected when recorded and subsequently played back, lip sync occurs in that the audio sound track would not follow its respective video images. The current professional studio practice is to cause non-phase-locked digitized video/audio material to first undergo digital to analog conversion and then analog to digital conversion at phase-locked rates to ensure relative frequency stability. The practice is costly, and time consuming. The above described practice has a further disadvantage in that it does not address the timing ill effects created by the extensive signal switching activities.

As a result, unpleasant audible 'clicks' and 'pops' are generated when the amount of data to be buffered exceeds the FIFO buffer size causing data to be skipped or when the amount of data in the buffer is exhausted by output causing data to be repeated. A single data skip or repeat is barely audible in the high frequency spectrum and it is considered to be acceptable by the current industry standard; but, more than one skip or repeat in series is unpleasant to the ears. FIFO buffer overflow and underflow do not occur under normal operations; however, the frequency drift and the extensive signal switching may cause data skips and data repeats. Currently, an apparatus and method to prevent multiple audio data skips and repeats occurring in series are not available for serial digital video interface.

The recent increase of video/audio switching and editing activities such as digital special effects, in professional studios has underscored the need for a low cost, improved performance, and ease of use apparatus and method addressing the video and audio synchronization timing effects brought on by a FIFO audio receiver buffer while complying with the SMPTE Standard. The present invention satisfies this need by maintaining the FIFO audio buffer at nominal fullness and delay by re-centering the buffer data size as its fullness gets out of an arbitrarily specified range.

SUMMARY OF THE INVENTION

The present invention provides an improved FIFO memory buffer and method for receiving a signal containing data samples and outputting these samples at an output frequency while maintaining the amount of time each data element spends in the buffer before being read out. The apparatus and method of the invention eliminate the lip sync problem and the audible 'clicks' and 'pops' in playback by maintaining the FIFO buffer fullness within a specified range.

A FIFO memory circuit receives data at an input write-data rate filling up the memory storage cells therein. An output read-data signal clocks the data out of the memory storage cells. The FIFO's fullness determined by the difference between its respective read (output) and write (input) address pointers, in response to a Buffer Centering signal, is checked against a variably and dynamically selected data size range, a range that is smaller than the FIFO buffer capacity. This specified range of data storage translates into a range of tolerable time delays for each buffered data element between FIFO data write and data read. If at Buffer Centering time, the FIFO buffer fullness is below the range's lower threshold or the lower time delay threshold, then the FIFO's read address pointer is held so that the immediately preceding read out data element is read out again, but only once. This provides more time for the input write-data signal to accumulate more data elements into the FIFO pushing the buffer fullness towards the center of the specified range. If on the other hand, the FIFO buffer fullness is over the range's upper limit or the upper time delay threshold, then the FIFO's write address pointer is held so that the immediately preceding written in data element is written over, but only once. This provides more time for the output read-data signal to reduce the buffer fullness towards the center of the specified range.

An alternative embodiment of the present invention eliminates the foregoing time delay problems associated with the magnetic audio recording/playback channel. To ensure video and audio synchronization in magnetic recording and subsequent playback, a FIFO buffer receives digitized audio samples in bursts at an input rate and output these samples at a different, usually lower rate. A data element time delay inside the buffer which is too long or too short will create lip sync, audio output mistracking the video images. An overflow or underflow of the buffer with more than one data element will cause the audible 'clicks' and 'pops'. The incorporation of the present invention into such an audio channel by keeping the buffer stored data size within a range will eliminate the lip sync and the audible 'clicks' and 'pops'.

The above advantages of the present invention will become apparent to those skilled in the art after having read the following detailed description as accompanied by the figures of the drawing.

DETAILED DESCRIPTION OF THE PREFERRED EMBODIMENTS

Figure 1:
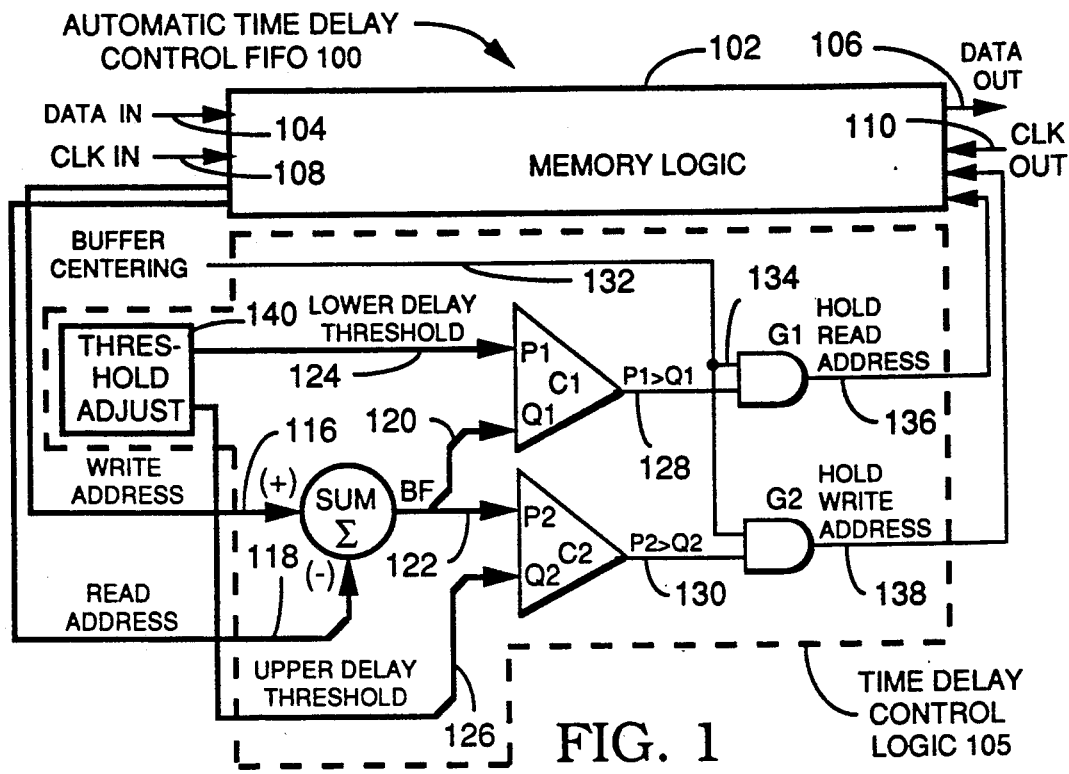
FIG. 1 is a functional logic diagram of an embodiment in accordance to the present invention.

It is noted that corresponding circuit elements in all the drawing Figures are designated by corresponding reference characters to facilitate comparison.

Referring now to the drawings, and more particularly, to FIG. 1, there is shown a functional logic diagram of an embodiment of the automatic time delay control FIFO generally designated 100. This FIFO 100 includes a memory logic 102 and a time delay control logic 105 (shown in broken lines).

The FIFO memory logic 102 functions are well known in the art and therefore, for purposes of clarity, the inner details are not shown. It serves as a data storage buffer which allows incoming data DATA IN to be written into data-storage locations at a write-data rate CLK IN over a path 104. The outgoing data DATA OUT is read out of the data-storage locations at a read-data rate CLK OUT over a path 106. Therefore, data reading and writing are controlled by separate clock signals CLK IN and CLK OUT over paths 108 and 110 respectively. The FIFO memory logic 102 is arranged so that the incoming data DATA IN which is first written into the storage device is read first out of the storage, hence, the name FIFO. FIFO memories are often provided as semiconductor integrated-circuit devices or as a part of an Application-Specific IC (ASIC). In the FIFO memory logic 102, a read-address pointer READ ADDRESS keeps track of the address of the first-written information and a write-address pointer WRITE ADDRESS keeps track of the next available memory location. A data element, either in serial or parallel form having a length of a fixed number of binary bits, goes directly into a memory cell from data input terminal of the FIFO located at the memory logic 102 end of the path 104. The data element from the memory cell goes directly to the output terminal, located at the memory logic 102 end of the path 106, of the FIFO memory without being serially transferred from storage cell to storage cell. Reading and writing of data are controlled by separate clock signals CLK IN and CLK OUT over paths 108 and 110 respectively.

The time delay control logic 105 includes a signal summation logic SUM, a pair of comparator logics C1 and C2, a threshold adjust logic 140, and a pair of address hold logics G1 and G2. The write-address pointer WRITE ADDRESS and the read-address pointer READ ADDRESS from the memory logic 102 are applied to the input terminals of the signal summation logic SUM. Signal WRITE ADDRESS goes into SUM via its non-inverting terminal (+) over a path 116. Signal READ ADDRESS goes into SUM via its inverting terminal (−) over a path 118. The resulting buffer fullness signal BF is applied to input terminal Q1 of the comparator logic C1 and input terminal P2 of the comparator logic C2 via paths 120 and 122 respectively. An arbitrarily set delay range is delimited by signals LOWER DELAY THRESHOLD which feeds into P1 terminal of the comparator logic C1 over path 124 and UPPER DELAY THRESHOLD which feeds into Q2 terminal of the comparator logic C2 over path 126. Both of these thresholds are set and adjusted by the threshold adjust logic 140. The output of C1, P1>Q1, is 'true' only if the buffer fullness signal BF is smaller in value than that of the LOWER DELAY THRESHOLD. On the other hand, the output of C2, P2>Q2, is 'true' only if the buffer fullness signal BF is larger in value than that of the UPPER DELAY THRESHOLD. The address hold logic G1 receives the signal P1>Q1 into one of its input terminals over path 128 and G2 receives the signal P2>Q2 into an input terminal over path 130. A delay control signal BUFFER CENTERING is applied to the other input terminals of G1 and G2 over paths 132, and 134. The address hold logic G1 will output a HOLD READ ADDRESS instruction to the memory logic 102 over a path 136 when signals BUFFER CENTERING and P1>Q1 are both 'true'. Analogously, the address hold logic G2 will issue a HOLD WRITE ADDRESS instruction to the memory logic 102 over a path 138 when signals BUFFERING CENTERING and P2>Q2 are both 'true'.

Operationally, data elements with a specific word length are asynchronously clocked into the automatic time delay control FIFO 100 by CLK IN. Typically, these data elements are clocked out by CLK OUT in the order in which they were received. Each data element spends a certain amount of time in the FIFO 100 waiting to be read out. This delay period will be longer when the FIFO memory is on the average nearly full than when the FIFO memory is typically close to empty. The time delay control logic 105 assesses the buffer fullness as reflected by the signal BF whenever the control logic 105 is enabled by the signal BUFFER CENTERING, an appropriate clock frequency signal which may be varied by hardware or software system components. The buffer fullness signal BF is compared against a designated 'fullness' range (or in other words, a designated 'time delay' range). If the buffer fullness signal BF indicates a level that is out of the range established by LOWER DELAY THRESHOLD and UPPER DELAY THRESHOLD, then automatic buffer size centering actions will occur to pull the buffer fullness towards the middle of the specified delay range. If the fullness is over the UPPER DELAY THRESHOLD, a HOLD WRITE ADDRESS instruction is issued holding the WRITE ADDRESS for one write cycle so to cause a data element to be skipped allowing the buffer size to fall within the specified range; if the fullness is below the LOWER DELAY THRESHOLD, a HOLD READ ADDRESS instruction is issued holding the READ ADDRESS for one read cycle so to cause a data element to be repeated allowing the buffer size to reach within the specified range. Implementations of the memory logic 102 and the time delay control logic 105 include but not limited to digital integrated circuits, ASIC technology or a combination of hardware and microcode instructions. An alternative embodiment of the present invention would include the time delay control logic 105 as a part of the operation in a programmable controller.

Figure 2:
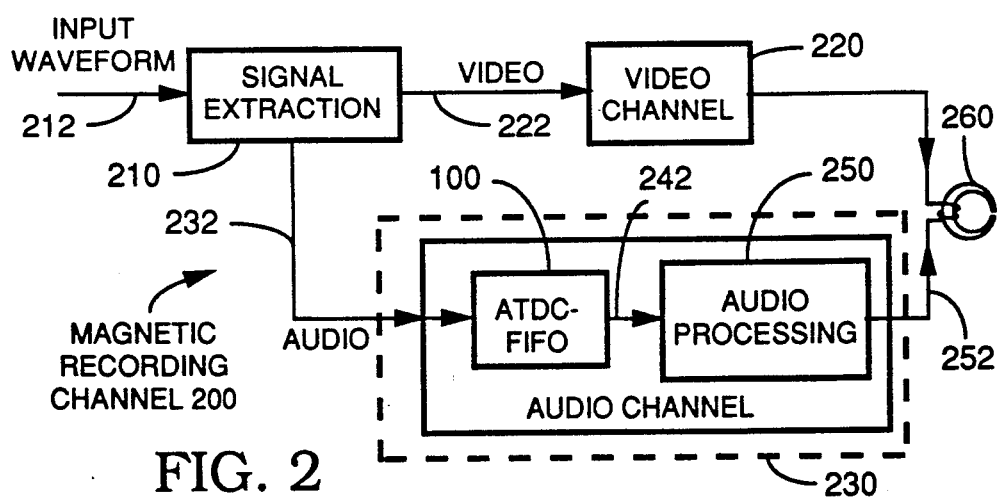
FIG. 2 is a functional block diagram of magnetic recording channel incorporating an automatic time delay control buffer in accordance to the present invention.
Figure 3:
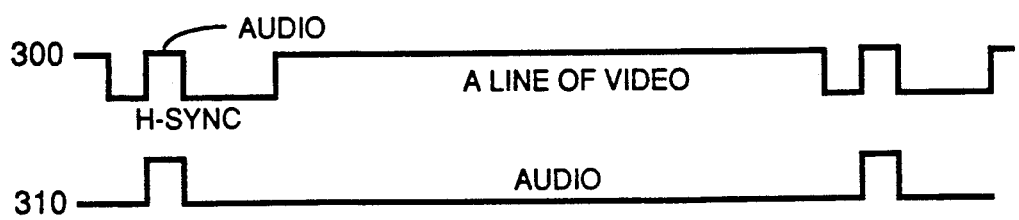
FIG. 3 is a simplified diagram depicting a multiplexed signal waveform timing relationship between video and audio information in accordance with the proposed SMPTE Standard 125M.

Referring now to FIGS. 2 and 3, there is provided another embodiment in accordance with the present invention constituting a magnetic recording channel generally designated 200. The magnetic recording channel 200 includes a signal extraction logic 210, a video channel logic 220, an audio channel logic 230 which comprises an automatic time delay control first-in first-out memory buffer (ATDC-FIFO) logic 100 and an audio processing logic 250, and a magnetic recording apparatus 260. The magnetic recording channel 200 receives a multiplexed signal INPUT WAVEFORM containing both the video and audio information and then separately records the video and audio information onto a magnetic medium by the magnetic recording apparatus 260 with an appropriate data format and timing synchronization. INPUT WAVEFORM on path 212 conforms to the video and audio timing relationship as it is crudely represented by signal 300 (See FIG. 3). Typically, in between every active video line, there is a horizontal sync time period, H-SYNC. This H-SYNC is a time period where video information is not present, allowing the electron beam steering mechanism to move from the end of one raster line to the start of the next line. Industry usage, such as the proposed SMPTE Standard 125M describing a serial digital video interface, allows ancillary information such as digitized audio samples to be inserted into these sync periods. INPUT WAVEFORM feeds into the signal extraction logic 210 over a path 212, the output of which, VIDEO and AUDIO signals, feed into a video channel 220 over path 222 and an audio channel 230 over path 232, respectively. AUDIO data is first applied to ATDC-FIFO 100 over path 232, and subsequently encoded in audio processing logic 250 via path 242 to a designated data format such as that in accordance with the Audio Engineering Society (AES3-1985, ANSI S4.40-1985) before being recorded by the magnetic recording apparatus 260 via path 252. AUDIO is represented by signal 310 wherein the square wave pulses each contains a number of digitized audio samples which each having a fixed number of binary data bits. VIDEO, the audio sample-striped INPUT WAVEFORM, is processed in the video channel 220 and recorded onto the magnetic medium by the magnetic recording apparatus 260 via path 262.

For a typical FIFO capacity, for examples, 16 or 64 words, each word or each data element having a fixed number of binary data bits, a range of tolerable mean input-output delay can be arbitrarily set and sought to be maintained to avoid lip sync problems when audio sound mistracks the video images. Furthermore, having such a range eliminates the unpleasant 'clicks' and 'pops' when more than one data element is repeated or skipped in series because it enables data skip or data repeat to occur only one at a time.

Operationally, in accordance to the proposed SMPTE Standard 125M, for a given amount of video, there will always be a certain number ($+/-1$) of audio samples. An audio sample can have up to several words and each word may contain a fixed number of data bits. These samples are placed in the horizontal ancillary data region, H-SYNC, of INPUT WAVEFORM. This multiplexed format applies to both component and composite technology. Regardless, in the magnetic recording channel 200, VIDEO and AUDIO are processed separately and therefore synchronization of the two is critical because a slight time delay difference will cause either lip sync or an audible 'click' or 'pop'. ATDC-FIFO 100, detailedly described above as in FIG. 1, is designed to output audio samples with a certain amount of time delay. In other words, over a field or frame, one would expect a nominal number of audio samples. However, if the switching activities or the relative frequency drift is allowed to persist, then the buffer could overflow or underflow causing a time delay unaccountable in the video channel 220 and therefore producing aforementioned problems.

If a signal at a reasonable rate, such as frame or field rate, is used to check how full the receiving memory buffer is, or in other words, how much delay audio samples incur in the receiving memory buffer, then a decision can be made whether too many or too few audio samples are in a fixed number of video frames. A sample may be skipped or repeated to keep the audio delay within a certain range and keeps the buffer from overflowing or underflowing. If the buffer is too full (or data delay is too long) when BUFFER CENTERING is 'true', one sample can be skipped by not allowing the buffer WRITE ADDRESS to increment for one write cycle. If the buffer is too empty (or data delay is too short) when BUFFER CENTERING goes high, one audio sample can be repeated by not allowing the read address to increment for one read cycle. Ultimately, signals coming out of the video channel 220 and the audio channel 230 will reach the magnetic recording apparatus 260 in appropriate synchronization.

The present invention and its various embodiments may be implemented in various types of digital logic families or technology. Logic reduction and transformation techniques may be employed to utilize other arrangements of gates or logic elements which are functionally equivalent to the one described here.

I claim:

1. An automatic fullness controlled FIFO buffer, comprising:
   FIFO memory logic means for inputting a plurality of data elements responsive to a first triggering signal, for writing the data elements into a plurality of memory cells in a sequence indicated by a write address pointer, and for outputting responsive to a second triggering signal the data elements from the plurality of memory cells in a first-in first-out sequence indicated by a read address pointer;
   a buffer centering signal; and,
   means responsive to the buffer centering signal for variably and dynamically controlling the memory logic means for maintaining the number of buffer memory cells holding the data elements within a range of buffer fullness, said controlling means including means for measuring the number of memory cells holding the data elements; means for variably and dynamically establishing the range of buffer fullness with an upper and a lower fullness threshold; means for inhibiting the write address pointer responsive to the measuring means when the number of memory cells holding the data elements numbers above the upper fullness threshold; and means for inhibiting the read address pointer responsive to the measuring means when the number of memory cells holding the data elements numbers below the lower fullness threshold.

2. The buffer of claim 1 wherein the buffer centering signal includes a periodic signal.

3. The buffer of claim 1 wherein the controlling means is programmable.

4. The buffer of claim 1 wherein the write address pointer inhibiting means includes means for performing a single write of a newly received data element into a immediately previously written memory, and the read address pointer inhibiting means includes means for performing a single read of a data element from an immediately previously read memory cell.

5. The buffer of claim 1 wherein the measuring means includes a means for taking the difference in content between the write address pointer and the read address pointer.

6. A magnetic recording channel logic, comprising:
   means for receiving a multiplexed video and audio signal and for outputting separate video and audio signals;
   video channel logic means for receiving and processing the video signal;
   a time delay control signal;
   audio channel logic means for receiving and processing the audio signal in timed relation with the video signal, the audio channel logic means including a FIFO memory buffer having a time delay control means responsive to the time delay control signal; and
   magnetic recording logic means including a magnetic head for recording the processed video and audio signals onto a magnetic medium;
   wherein the time delay control FIFO memory buffer comprises:
   means for measuring the FIFO memory buffer time delay;
   means for variably and dynamically establishing a range of buffer time delays with an upper and a lower time delay threshold;
   means, responsive to the measuring means, for inhibiting a write address pointer of the FIFO memory buffer when the FIFO memory buffer time delay measures beyond the upper time delay threshold; and
   means, responsive to the measuring means, for inhibiting a read address pointer of the FIFO memory buffer when the FIFO memory buffer time delay measures below the lower time delay threshold.

7. The magnetic recording channel logic of claim 6 wherein the time delay control signal includes a periodic signal.

8. The magnetic recording channel logic of claim 6 wherein the time delay control means is programmable.

9. The magnetic recording channel logic of claim 6 wherein the write address pointer inhibiting means includes means for performing a single write of a newly received data element into an immediately previously written memory, and the read address pointer inhibiting means includes means for performing a single read of a data element from an immediately previously read memory cell.

10. The magnetic recording channel logic of claim 6 wherein the measuring means includes a means for taking the difference in content between the write address pointer and the read address pointer.

11. An automatic FIFO fullness control method, comprising the steps of:
    serially inputting into the buffer a plurality of data elements;
    writing the data elements into a plurality of memory cells in a sequence indicated by a write address pointer;
    selectively reading out the data elements from the plurality of memory cells in a first-in first-out sequence indicated by a read address pointer;
    receiving a buffer centering signal; and
    maintaining, in response to the buffer centering signal, variably and dynamically the number of memory cells holding the data elements within a range of buffer fullness, said maintaining step further including the steps of (a) measuring the number of memory cells holding the data elements; (b) establishing an upper and a lower buffer fullness thresholds; (c) inhibiting the write address pointer when the number of memory cells holding the data elements numbers above the upper fullness threshold; and (d) inhibiting the read address pointer when the number of memory cells holding the data elements numbers below the lower fullness threshold.

12. The method of claim 11 wherein the buffer centering signal includes a periodic signal.

13. The method of claim 11 wherein the maintaining step includes means for programmably controlling the upper and lower buffer fullness thresholds.

14. The method of claim 11 wherein the write address pointer inhibiting step includes an step for performing a single write of a newly received data element into a immediately previously written memory, and the read address pointer inhibiting step includes a step for performing a single read of a data element from an immediately previously read memory cell.

15. The method of claim 11 wherein the measuring step includes step for taking the difference in content between the write address pointer and the read address pointer.

16. A method for magnetic recording channel processing, comprising the steps of:
receiving a multiplexed video and audio signal;
outputting separate video and audio signals;
transferring the video signal into a video channel means for processing before magnetic recording;
transferring the audio signal into an audio channel logic means;
processing the audio signal in the audio channel logic means, the processing step including a time delay control step responsive to a time delay control signal; and
recording processed video signal an processed audio signal in timed relation onto a magnetic medium;
wherein the time delay control step comprises the steps of:
measuring the FIFO memory buffer time delay;
establishing variably and dynamically in a FIFO memory buffer an upper and a lower time delay thresholds;
inhibiting a write address pointer when the FIFO memory buffer time delay measures beyond the upper time delay threshold;
inhibiting a read address pointer when the FIFO memory buffer time delay measures below the lower time delay threshold.

17. The method of claim 16 wherein the time delay control signal includes a periodic signal.

18. The method of claim 16 wherein the time delay control step includes a means for programmably controlling the upper and lower time delay thresholds.

19. The method of claim 16 wherein the write address pointer inhibiting step includes a step for performing a single write of a newly received data element into an immediately previously written memory, and the read address pointer inhibiting step includes a step for performing a single read of a data element from an immediately previously written memory cell.

20. The method of claim 16 wherein the measuring step includes a step for taking the difference in content between the write address pointer and the read address pointer.

21. An automatic fullness controlled FIFO buffer, comprising:
FIFO memory logic means for inputting a plurality of data elements responsive to a first triggering signal, for writing the data elements into a plurality of memory cells in a sequence indicated by a write address pointer, and for outputting responsive to a second triggering signal the data elements from the plurality of memory cells in a first-in first-out sequence indicated by a read address pointer;
a buffer centering signal; and
means responsive to the buffer centering signal for variably and dynamically controlling the memory logic means, said controlling means including means for inhibiting write and read address pointers for maintaining the number of buffer memory cells holding the data elements within a range of buffer fullness by performing a single write of a newly received data element into an immediately previously written memory, and by performing a single read of a data element from an immediately previously read memory cell.

22. A magnetic recording channel logic, comprising:
means for receiving a multiplexed video and audio signal and for outputting separate video and audio signals;
video channel logic means for receiving and processing the video signal;
a time delay control signal;
audio channel logic means for receiving and processing the audio signal in timed relation with the video signal, the audio channel logic means including a FIFO memory buffer having a time delay control means responsive to the time delay control signal, said time delay control means including means for inhibiting write and read address pointers for maintaining the number of buffer memory cells holding the data elements within a range of buffer fullness by performing a single write of a newly received data element into an immediately previously written memory, and by performing a single read of a data element from an immediately previously read memory cell; and
magnetic recording logic means including a magnetic head for recording the processed video and audio signals onto a magnetic medium.

23. An automatic FIFO fullness control method, comprising the steps of:
serially inputting into the buffer a plurality of data elements;
writing the data elements into a plurality of memory cells in a sequence indicated by a write address pointer;
selectively reading out the data elements from the plurality of memory cells in a first-in first-out sequence indicated by a read address pointer;
receiving a buffer centering signal; and
maintaining, in response to the buffer centering signal, variably and dynamically the number of memory cells holding the data elements within a range of buffer fullness, said maintaining step further including the steps of (a) performing a single write of a newly received data element into an immediately previously written memory; and (b) performing a single read of a data element from an immediately previously read memory cell.

24. A method for magnetic recording channel processing, comprising the steps of:
receiving a multiplexed video and audio signal;
outputting separate video and audio signals from the receiving means;
transferring the video signal into a video channel means for processing before magnetic recording;
transferring the audio signal into an audio channel logic means;

processing the audio signal in the audio channel logic means, the processing step including a time delay control step responsive to a time delay control signal, said time delay control step further including the steps of (a) performing a single write of a newly received data element into an immediately previously written memory; and (b) performing a single read of a data element from an immediately previously read memory cell; and recording processed video signal and processed audio signal in timed relation onto a magnetic medium.

* * * * *